United States Patent
Jewers et al.

(10) Patent No.: US 6,898,026 B2
(45) Date of Patent: May 24, 2005

(54) OPTICAL ELEMENT

(75) Inventors: Carl P. Jewers, Milford, OH (US); James J. Cushenberry, Loveland, OH (US); Kathleen E. Allen, Crescent Springs, KY (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/638,791

(22) Filed: Aug. 11, 2003

(65) Prior Publication Data

US 2005/0036214 A1 Feb. 17, 2005

(51) Int. Cl.[7] .............................. G02B 9/00; G02B 7/02; B39C 39/12
(52) U.S. Cl. .................... 359/738; 359/820; 264/245
(58) Field of Search ................ 359/642, 738, 359/811, 820; 264/241, 245

(56) References Cited

U.S. PATENT DOCUMENTS

| | | | |
|---|---|---|---|
| 4,989,960 A | * | 2/1991 | Thomas ...................... 359/738 |
| 6,072,634 A | | 6/2000 | Broome et al. ............. 359/637 |
| 6,341,901 B1 | * | 1/2002 | Iwasa et al. ................ 396/355 |
| 6,441,976 B1 | | 8/2002 | Okorocha |
| 6,552,859 B1 | * | 4/2003 | Matsumoto et al. ........ 359/738 |
| 6,560,040 B2 | * | 5/2003 | Kaneko et al. ............. 359/739 |
| 6,603,614 B2 | * | 8/2003 | Fulkerson et al. .......... 359/820 |
| 2002/0101668 A1 | | 8/2002 | Fulkerson et al. |

FOREIGN PATENT DOCUMENTS

| | | |
|---|---|---|
| JP | 63270123 | 11/1988 |
| JP | 2823587 | 11/1990 |
| JP | 3001919 | 1/1991 |
| JP | 04069221 | 3/1992 |
| JP | 7-45199 | 2/1995 |
| JP | 7108560 | 4/1995 |
| JP | 11-245259 | 9/1999 |

* cited by examiner

Primary Examiner—David N. Spector

(57) ABSTRACT

An optical element is disclosed that includes a non-planar lens having a lens perimeter with an integral flange surrounding the lens perimeter. The flange has a first surface and a second surface opposing the first surface. An annular plastic opaque mask layer is fused to the flange first surface or the flange second surface and extending onto the non-planar lens.

20 Claims, 3 Drawing Sheets

OPTICAL ELEMENT

BACKGROUND OF THE INVENTION

A projection television set typically includes three cathode ray tubes (CRTs), corresponding to the primary colors, red, blue and green. A projection lens assembly uses a plurality of lens to magnify the image appearing on the CRT faceplate and project that image onto a much larger viewing screen. CRTs used in projection televisions typically have a diameter of 3 to 9 inches. The image projected onto the screen generally has a size ranging from 40 to 60 inches or larger measured diagonally.

Each CRT has an associated magnifying lens system mounted adjacent to the CRT faceplate. Usually, the lens assembly is formed with at least one "A" lens element, at least one "B" lens element and at least one "C" lens element. Regardless of the number of lens elements, these are generally referred to in the art as "A", "B" and "C" lens groups. That is, each "group" can be comprised of one or more lens elements. The "B" lens group usually includes a lens formed of glass, while the "A" and "C" lens groups can be formed of plastic. However, it should be understood that each group can include one or more lenses formed of glass and one or more lenses formed of plastic. Alternatively, the lens assemblies can include all glass lenses or all plastic lenses.

These lenses typically include a mounting flange attached to the lens. This flange can be masked to block unwanted light transmission through or near the flange. The mask can extend along the curve of the optic up to a place on the curve where light is allowed through the lens or "clear aperture".

This mask can be painted onto the flange. However, drawbacks to painting on the mask include the need for an additional step for applying the mask and subsequent cleaning processes, the release of unwanted volatile organic components from the painting process, creation of hazardous waste from the painting and cleaning processes and difficulties with further processing steps, to list a few.

SUMMARY OF THE INVENTION

Generally, the present invention relates to optical elements useful for a variety of applications including, for example, optical lens assemblies for displays, such as projection televisions, as well as the displays and other devices containing the optical elements.

In one embodiment, an optical element includes a non-planar lens having a lens perimeter with an integral flange surrounding the lens perimeter. The flange has a first surface and a second surface opposing the first surface. An annular plastic opaque mask layer is fused to the flange first surface or the flange second surface and extending onto the non-planar lens.

In a further embodiment, a projection television includes a light source; a display medium; and a lens element disposed between the light source and display medium. The lens element includes a non-planar lens having a lens perimeter with an integral flange surrounding the lens perimeter. The flange has a first surface and a second surface opposing the first surface. An annular plastic opaque mask layer is fused to the flange first surface or the flange second surface.

In another embodiment, a method of forming an optical element includes forming a non-planar lens having a lens perimeter and a flange surrounding the lens perimeter. The flange has a first surface and a second surface opposing the first surface. An annular plastic opaque mask layer is fused to the flange first surface or the flange second surface and extending onto the non-planar lens.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
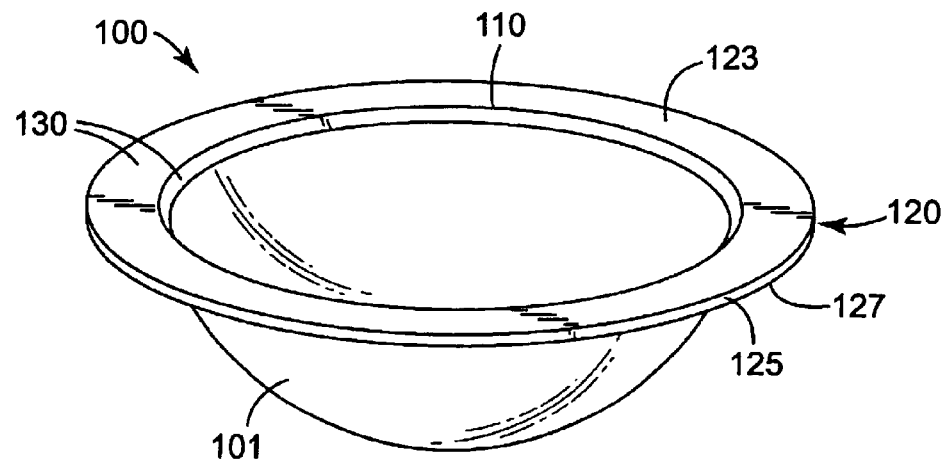
FIG. 1 is a perspective view of a lens according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The optical elements and process for making optical elements of the present invention are believed to be applicable to a variety of applications needing masked optical elements including, for example, optical assemblies, optical projection systems, such as projection televisions, as well as the displays and other devices containing the optical assemblies. While the present invention is not so limited, an appreciation of various aspects of the invention will be gained through a discussion of the examples provided below.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including trnsesterification. Both block and random copolymers are included, unless indicated otherwise.

The term "plastic" refers to a polymer, usually synthetic, that can be combined with other ingredients, such as for example, curatives, fillers, reinforcing agents, colorants, plasticizer, etc.; the mixture can be formed or molded under heat and pressure and machined to high dimensional accuracy, trimmed, and finished in its hardened state. A thermoplastic-type plastic can be re-softened to its original condition by heat; the thermosetting-type plastic cannot be re-softened to its original condition by heat.

The term "fuse", "fusing" or "fused" refers to joining, uniting, welding elements together with energy such as thermal energy.

The phrase "non-planar lens" refers to a light transmitting article with a spherical or aspherical lens that is concave, convex, bi-concave, bi-convex, or the like.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

FIG. 1 is a perspective view of a lens 100 according to an embodiment of the invention. A curved portion 101 of the non-planar lens 100 has a perimeter 110 and an integral flange 120 that surrounds the curved portion 101 of the non-planar lens 100 at the perimeter 110.

The flange 120 has a first surface 123, a second surface 127 opposing the first surface 123 and a flange thickness 125 defined by a distance between the first surface 123 and second surface 127. The flange 120 can have any desired thickness 125. The flange 120 can have a thickness 125 of at least 0.1 mm or 1 mm to 25 mm or 1 mm to 10 mm. The flange first surface 123 and flange second surface 127 can be planar. The flange 120 and curved portion 101 of the lens 100 can be formed from a thermoplastic such as for example, polyacrylate or polycarbonate.

An annular plastic opaque mask layer 130 is fused to and within the lens perimeter 110 onto the curved portion 101 of the lens 100 (forming the clear aperture) and either the first surface 123 or the second surface 127 or both the first surface 123 and the second surface 127. The annular plastic opaque mask layer 130 can be fused to a portion of the first surface 123 or the entire first surface 123. The annular plastic opaque mask layer 130 can be fused to a portion of the second surface 127 or the entire second surface 127. The annular plastic opaque mask layer 130 can be fused only to a portion of the second surface 127 and/or a portion of the first surface 125. The annular plastic opaque mask layer 130 may not extend within or even onto the lens perimeter 110 or curved portion 101 of the lens 100, depending on the particular application of the lens 100.

The annular plastic opaque mask layer 130 can have a thickness of 0.1 mm to 1 mm (0.004 to 0.04 inch) or 0.2 mm to 0.4 mm (0.007 to 0.015 inch). The flange 120 and annular plastic opaque mask layer 130 can have a concentricity of no more than 1 mm, no more than 0.75 mm, or no more than 0.5 mm.

The plastic mask layer 130 glass transition temperature ($T_g$) can be the same or greater than the concave or convex lens glass transition temperature ($T_g$). The plastic mask layer 130 glass transition temperature ($T_g$) is preferably 1–50%, or 1–25%, 1–15% or 1–10% greater than the concave or convex lens glass transition temperature ($T_g$). The annular plastic opaque mask layer 130 can be formed from a thermoplastic such as for example, polyacrylate, polycarbonate, and the like and can include a dye or pigment (black, grey, brown, or the like) to provide opacity.

While FIG. 1 shows a "C" lens 100, any lens that includes a mask layer is contemplated herein. In addition, in the context of a projection television, the lens 100 can be an "A" lens, "B" lens, "C" lens, or the like.

Figure 2:
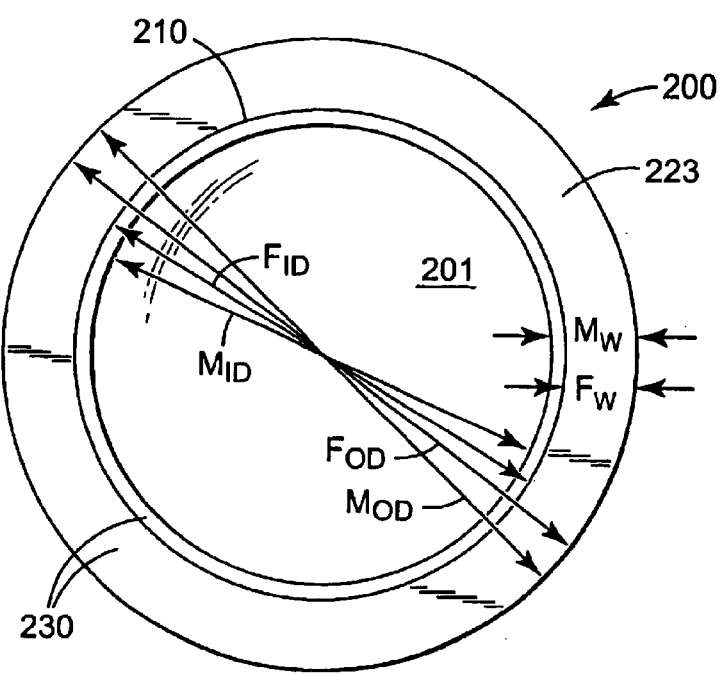
FIG. 2 is a front elevation view of the lens shown in FIG. 1.

FIG. 2 is a front elevation view of the non-planar lens 100 shown in FIG. 1. The non-planar lens 200 has a curved portion 201 surrounded by a lens perimeter 210 and a flange surface 223 surrounding the lens perimeter 210. The annular plastic opaque mask layer 230 can be fused to the flange surface 223, the lens perimeter 210 and onto the curved portion 201. The flange has a width $F_w$ of 1 mm to 75 mm or 3 mm to 25 mm or 5 mm to 15 mm. The annular plastic opaque mask layer 230 can have a width $M_w$ that is greater than the flange width $F_w$, such that the annular plastic opaque mask layer 230 extends the entire width of the flange surface 223 and onto the curved portion 201 of the lens 200 within the lens perimeter 210. The annular plastic opaque mask layer 230 can have a width $M_w$ that is at least 1%, 10%, 20% or 30% greater than the flange width $F_w$. The annular plastic opaque mask layer 230 can have a width $M_w$ that is equal to the flange width $F_w$. The annular plastic opaque mask layer 230 can have a width $M_w$ that is less than the flange width $F_w$, such that the annular plastic opaque mask layer 230 extends from the curved portion 201 of the lens 200 or the lens perimeter 210 and onto the flange surface 223 and being at least 1%, 10%, 20% or 30% less than the flange width $F_w$, leaving a portion of the flange surface 223 free of annular plastic opaque mask layer 230.

The flange 223 can have an inner flange diameter $F_{id}$ and an outer flange diameter $F_{od}$. The mask 230 can have an inner mask diameter $M_{id}$ and an outer mask diameter $M_{od}$. The outer mask diameter $M_{od}$ can be the same or less than the flange outer diameter $F_{od}$. The outer mask diameter $M_{od}$ can be 1–20%, 1–10% or 1–5% less than the flange outer diameter $F_{od}$. The inner mask diameter $M_{id}$ can be the same or less than the flange inner diameter $F_{id}$. The inner mask diameter $M_{id}$ can be 1–20%, 1–10% or 1–5% less than the flange inner diameter $F_{id}$. Thus, a portion of the mask 230 can be fused onto the lens perimeter 210 and extend onto a curved portion 201 of the lens 200.

Figure 3:
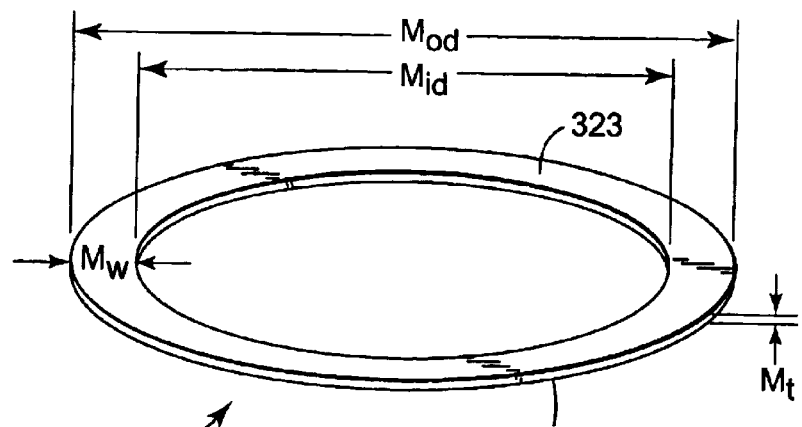
FIG. 3 is a perspective view of an annular plastic opaque mask layer according to an embodiment of the invention.

FIG. 3 is a perspective view of an annular plastic opaque mask layer 300 according to an embodiment of the invention. The annular plastic opaque mask layer 300 has a mask first surface 323 and an opposing mask second surface 327 and a mask thickness $M_t$ defined by a distance therebetween. Prior to being fused onto the lens 100, 200, the annular plastic opaque mask layer 300 can be planar. The annular plastic opaque mask layer 300 has a mask inner diameter $M_{id}$ and a mask outer diameter $M_{od}$ as described above.

Figure 4:
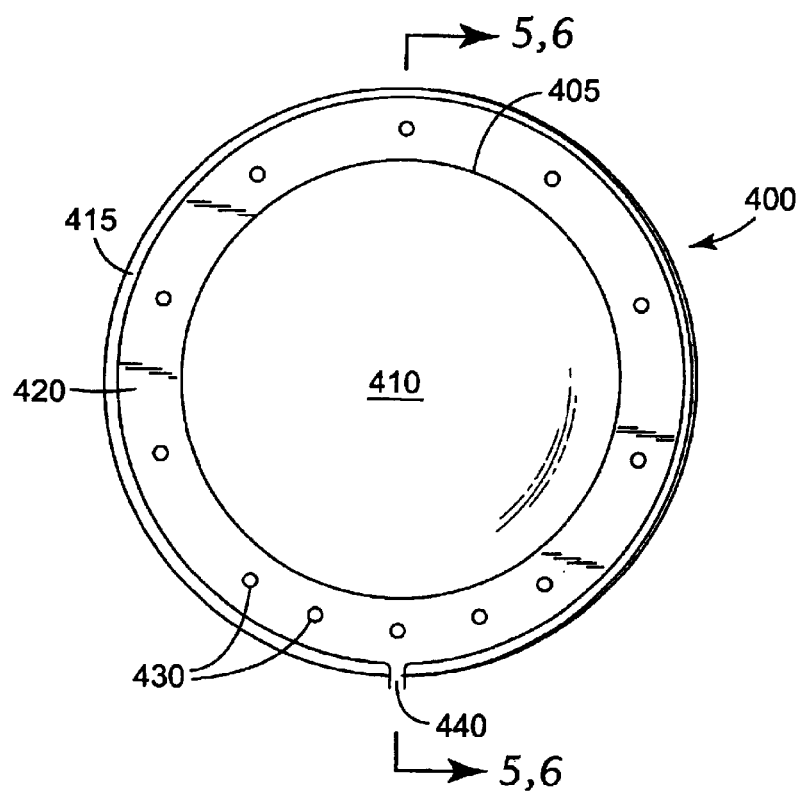
FIG. 4 is a front elevation view of a mold face for manufacturing the lens shown in FIG. 1.

FIG. 4 is a front elevation view of a mold face 400 for manufacturing the lens 100 shown in FIG. 1. The mold face 400 shown utilizes in injection molding process, however any process that uses heat and pressure to form a lens is contemplated herein. The moldface 400 can have a non-planar lens surface 410. The lens surface 410 shown is a convex surface. A flange recess 420 surrounds the lens surface 410 and a transition 405 is disposed between the flange recess 420 and the lens surface 410. Vacuum ports 430 can be disposed within the flange recess 420. An outer wall 415 surrounds the flange recess 420. A gate 440 allows molten lens material to enter the mold 400 is disposed through the flange recess 420.

Figure 5:
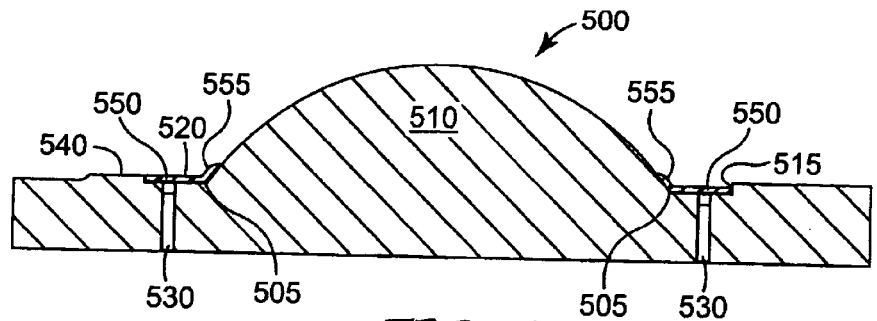
FIG. 5 is a cross-sectional view of the mold face taken along the line 5-6 in FIG. 4 prior to forming the lens.

FIG. 5 is a cross-sectional view of the mold face taken along the line 5-6 in FIG. 4 prior to forming the lens 100. The mold face 500 can have a non-planar lens surface 510. The lens surface 510 shown is a convex surface. A flange recess 520 surrounds the lens surface 510 and a transition 505 is disposed between the flange recess 520 and the lens surface 510. Vacuum ports 530 can be disposed within the flange recess 520. An outer wall 515 surrounds the flange recess 520. A gate 540 allows molten lens material to enter the mold 500 is disposed through the flange recess 520.

An annular plastic opaque mask layer 550 is shown disposed within the flange recess 520. The annular plastic opaque mask layer 550 includes a portion 555 that extends beyond the transition 505 onto the lens surface 510. The portion 555 can extend any distance onto the lens curvature 510 such as, for example, 1 mm to 5 mm or 2 mm to 4 mm. The mold 500 can be hot enough to allow the annular plastic opaque mask layer 550 to deform as shown in FIG. 5 or the annular plastic opaque mask layer 550 can deform as shown in FIG. 5 due to pressure applied by the lens material forced into the mold or by the mold face plate pressure as shown in FIG. 6.

The vacuum ports 530 can apply a vacuum to the annular plastic opaque mask layer 550 to maintain the annular plastic opaque mask layer 550 in place, however other alignment means can be employed also. The gate 540 can be placed within the outer wall 515 such that molten lens material flows on top of the annular plastic opaque mask layer 550. The mask 550 can fit securely in the flange recess 520 forming a tight fit against the outer wall 515 or the mask 550 can fit in the flange recess 520 but spaced away from the outer wall 515 any distance such as, for example, 0.1 mm to 1 mm (0.004 to 0.04 inch) or 0.2 mm to 0.4 mm (0.007 to 0.015 inch) or 0.3 mm (0.012 inch).

Figure 6:
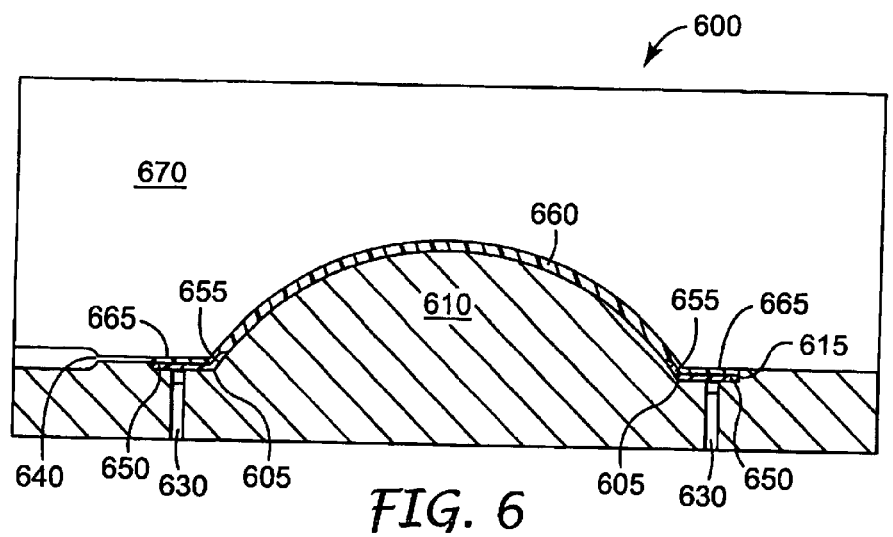
FIG. 6 is a cross-sectional view of the mold face taken along the line 5-6 in FIG. 4 following the formation of the lens.

FIG. 6 is a cross-sectional view of the mold 600 taken along the line 5-6 in FIG. 4 following the formation of the lens 100. A mold face plate 670 can be placed on the mold face 610 forming a cavity where the lens 100 can be formed. Molten lens material, which can be any clear thermoplastic material, enters the mold 600 via the gate 640 and flows onto the annular plastic opaque mask layer 650 including the portion 655 extending beyond the transition 605. The molten lens material flows onto the lens surface 610 forming the curved portion 660 of the lens. The molten lens material forms the flange 665 and lens 660. The molten lens material fuses with the annular plastic opaque mask layer 650 forming a unitary element.

During the formation of the lens 100, the mold 600 temperature can be any useful temperature sufficient to deform the annular plastic opaque mask layer 650 into the flange recess 630 and lens surface 610 such as, for example, 70° C. to 100° C. The molten lens material can be any useful temperature sufficient to fuse the annular plastic opaque mask layer 650 to the flange 665 and/or lens 660 such as, for example, 200° C. to 300° C. The mold 600 can be filled at any useful pressure such as, for example, 7,000 kPa The lens 100 can be formed at any useful pressure such as, for example, 70,000 kPa.

Figure 7:
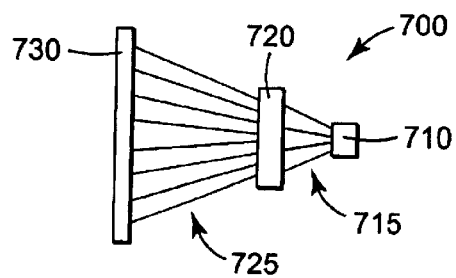
FIG. 7 is a schematic of a projection television display system.

FIG. 7 is a schematic of a projection television display system 700. A projection television display system 700 includes a light source 710 such as, for example, a cathode ray tube, a display medium 730 and a lens assembly 720 disposed between the light source 710 and the display medium 730. The light source 710 emits light 715. The lens assembly 720 manipulates the emitted light 715 into projected light 725 onto the display medium. Details of a lens assembly 720 can be found for example, in U.S. Pat. No. 6,441,976 and U.S. Patent Application Publication US 2002/0101668 A1, both incorporated by reference herein.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

We claim:

1. An optical element comprising:
    a) a non-planar lens having a lens perimeter and an integral flange surrounding the lens perimeter, the flange having a first surface and a second surface opposing the first surface; and
    b) an annular plastic opaque mask layer fused to the flange first surface or the flange second surface and extending onto the non-planar lens.

2. The optical element according to claim 1, wherein the annular plastic opaque mask layer has a thickness of 0.2 mm to 0.4 mm.

3. The optical element according to claim 1, wherein the flange has a thickness of 1 to 25 mm.

4. The optical element according to claim 1, wherein the flange and the mask has a concentricity of no more than 0.5 mm.

5. The optical element according to claim 1, wherein the plastic mask layer has a plastic mask layer glass transition temperature and the concave or convex lens has a concave or convex lens glass transition temperature and the plastic mask layer glass transition temperature is greater than the concave or convex lens glass transition temperature.

6. The optical element according to claim 1, wherein the plastic mask layer is formed of a polyacrylate and the concave or convex lens is formed of a polyacrylate.

7. The optical element according to claim 1, wherein the plastic mask layer is fused directly to the flange first surface or flange second surface.

8. The optical element according to claim 1, wherein the plastic mask layer has a width and the flange has a width and the plastic mask layer width is greater than the flange width.

9. The optical element according to claim 1, wherein the flange first surface and the flange second surface are planar.

10. The optical element according to claim 1, wherein the annular plastic opaque mask layer is fused to the lens perimeter and the entire first surface or the entire second surface.

11. A projection television comprising:
    a) a light source;
    b) a display medium; and
    c) a lens element disposed between the light source and display medium, wherein the lens element comprises:
        i) a non-planar lens having a lens perimeter with an integral flange surrounding the lens perimeter, the flange having a first surface and a second surface opposing the first surface; and
        ii) an annular plastic opaque mask layer fused to the flange first surface or the flange second surface.

12. The projection television according to claim 11, wherein the annular plastic opaque mask layer extends onto the non-planar lens.

13. The projection television according to claim 11, wherein the light source is a cathode ray tube.

14. A method of forming an optical element comprising:
    a) forming a non-planar lens having a lens perimeter and a flange surrounding the lens perimeter wherein the flange has a first surface and a second surface opposing the first surface; and
    b) fusing an annular plastic opaque mask layer to the flange first surface or the flange second surface and extending onto the non-planar lens.

15. The method according to claim 14, wherein the fusing an annular plastic opaque mask layer occurs at the same time as the forming a non-planar lens having a lens perimeter and a planar flange surrounding the lens perimeter wherein the flange has a first surface, a second surface opposing the first surface.

16. The method according to claim 14, wherein the forming comprises forming a non-planar lens having a lens perimeter and a planar flange surrounding the lens perimeter wherein the planar flange has a first surface, a second surface opposing the first surface by injection molding.

17. The method according to claim 16, wherein the forming further comprises disposing the annular plastic opaque mask layer on a moldface prior to forming the non-planar lens on the moldface.

18. The method according to claim 17, wherein the forming further comprises injecting a non-planar lens material on the annular plastic opaque mask layer at a temperature sufficient to fuse the annular plastic opaque mask layer to the non-planar lens material.

19. The method according to claim 18, wherein the forming comprises disposing a planar annular plastic opaque mask layer having a width and the flange having a width where the mask layer width is greater than the flange width.

20. The method according to claim 19, wherein the fusing comprises fusing the flange and the mask having concentricity of no more than 0.5 mm.

* * * * *

UNITED STATES PATENT AND TRADEMARK OFFICE
CERTIFICATE OF CORRECTION

PATENT NO. : 6,898,026 B2
DATED : May 24, 2005
INVENTOR(S) : Jewers, Carl P.

It is certified that error appears in the above-identified patent and that said Letters Patent is hereby corrected as shown below:

Column 2,
Line 60, delete "trnsesterification" and insert -- transesterification --.

Column 5,
Line 52, after "kPa" insert -- . --.

Signed and Sealed this

Seventeenth Day of January, 2006

JON W. DUDAS
*Director of the United States Patent and Trademark Office*